United States Patent [19]

Jones

[11] 3,748,534

[45] July 24, 1973

[54] FILTER-CONTROL CIRCUIT

[75] Inventor: Roy W. Jones, Rochester, N.Y.

[73] Assignee: Stromberg-Carlson Corporation, Rochester, N.Y.

[22] Filed: July 11, 1972

[21] Appl. No.: 270,749

[52] U.S. Cl. .................... 317/12 B, 317/20, 317/16, 317/50, 317/36 TD, 317/41, 320/1, 317/142 TD

[51] Int. Cl. .............................................. H02h 7/16

[58] Field of Search ...................... 317/12 B, 20, 16, 317/31, 36 TD, 41, 50, 142 TD; 307/98, 99, 100, 130; 320/1

[56] References Cited

UNITED STATES PATENTS 1,939,064 12/1933 Kopczynski .......................... 317/20

3,365,617 1/1968 Flanagan .............................. 317/50

*Primary Examiner*—J. D. Miller
*Assistant Examiner*—Harvey Fendelman
*Attorney*—Charles C. Krawczyk

[57] ABSTRACT

A filter-control circuit for incorporation into power supplies such as those used in telephone systems, includes a switching circuit which enables the filter-control circuit to be automatically switched from a charging condition to a filtering condition when the charge on a capacitor in the filter-control circuit has been established. In case of capacitor failure the switching circuit operates to swtich in a current limiting circuit into the circuit to maintain operation of the system until the circuit can be withdrawn from service for repair. Alarm means may be provided to signal any occurrance of a breakdown of the capacitor.

9 Claims, 1 Drawing Figure

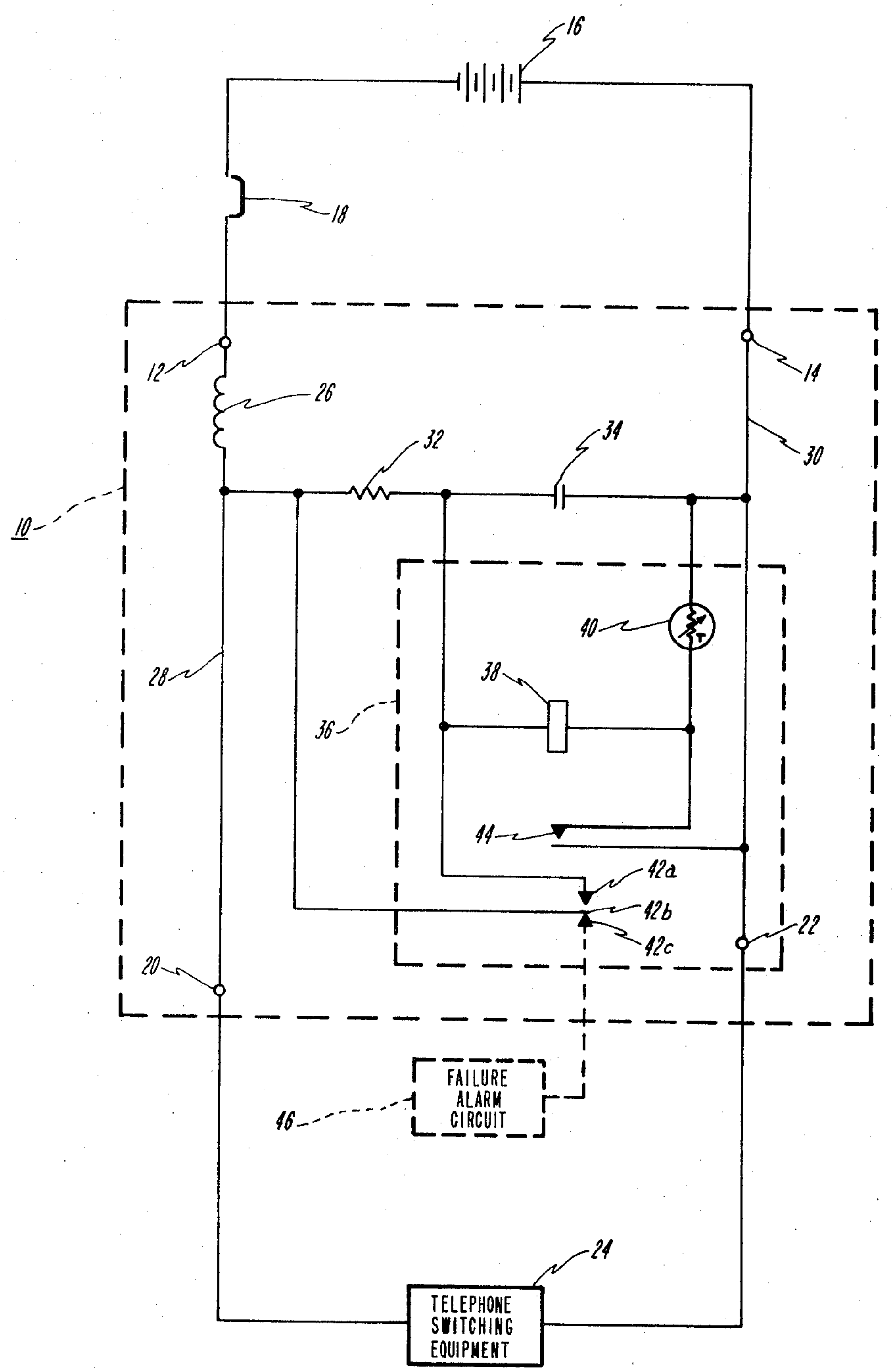
16
18
12
26
14
30
32
34
10
40
38
28
36
44
42a
42b
42c
22
20
FAILURE ALARM CIRCUIT
46
24
TELEPHONE SWITCHING EQUIPMENT

FILTER-CONTROL CIRCUIT

BACKGROUND OF THE INVENTION

This invention relates to a filter-control circuit for initially charging large filter capacitors in power supplies of the type used in telephone switching system and to prevent shut down in case of capacitor failure.

Filtering of the DC power supplies of the type used to power telephone switching systems is used to avoid voltage transients which may affect the proper operation of critical telephone circuits. Filtering is particularly important on the DC power which is provided for telephone transmission circuits. The telephone transmission circuit must be free of noise, or at least substantially free of noise, for maximum beneficial subscriber usage.

The filtering required for a typical telephone switching system requires the use of very high capacitance capacitors. Such required capacitors have values in the order of from 20,000 mf to 40,000 mf. This is due to the low impedance of the battery of the power source, the low total resistance of the power leads, and the low impedance of the leads connected to the telephone switching system.

The initial connection of these large capacitors to the leads of the battery of the power source causes a high charging current to flow. The magnitude of the current flow may be of a sufficient value to cause the premature operation of protection devices, such, for example, as fuses and/or circuit breakers in the filter circuit. The premature operation of the protection devices while charging must be avoided to prevent accidental interruption of the normal operation of the telephone system.

Special arrangements are provided in prior art charging circuits to prevent the premature operation of the protection devices during the charging of the capacitor. In a typical prior art circuit arrangement, a current limiting resistor is provided in a circuit means connected in a parallel circuit arrangement with a circuit breaker. A non-locking, manually operated, pushbutton switch is connected in series with the current limiting resistor during the initial charging of the capacitor whereby the current limiting resistor limits the charging current to a value that will prevent the premature operation of the protection devices. When the capacitor has been sufficiently charged, the circuit breaker is closed, the pushbutton switch is released, the current limiting resistor is removed from the circuit and the capacitor is charged to its full capacity through the circuit breaker. The magnitude of the charging current flow at this time has been reduced sufficiently to prevent the premature operation of the circuit breaker. The capacitor charges to its maximum capacity and begins its filtering operation. The filtering action of the capacitor continues until either the capacitor fails or the filter circuit is opened by some other means. Each individual filter circuit must be started in this way requiring an attendant to stand by to manually start the charging of the capacitor and to manually switch the circuit from a charging state to a filtering state. It is readily seen that this is a time consuming effort on the part of plant personnel. Additionally, should a failure of the capacitor occur with no fuse connected in series with the capacitor, the circuit breaker will open and the telephone system becomes inoperative until repaired.

It is therefore an object of this invention to provide a new and improved filter-control circuit for use in power supplies of the type used in telephone systems.

Another object of this invention is to provide a new and improved filter-control circuit for power supplies wherein the capacitor connected therein is automatically switched from a charging state to a filtering state when the capacitor is charged to a preset level.

A further object of this invention is to provide a new and improved filter-control circuit for power supplies wherein when the capacitor fails, the power supply continues to operate until the system can be shut down for repairs.

Other objects of this invention will, in part, be obvious and will, in part, appear hereinafter.

BRIEF DESCRIPTION OF THE INVENTION

In accordance with the teachings of this invention there is provided a filter-control circuit comprising a pair of input terminals for connection to a low impedance DC power source and a pair of output terminals for connection to a high current load. A low resistance lead interconnects separate terminals of each of the pairs of terminals. A first series circuit including a resistor and a capacitor are connected across the pair of leads. A second series circuit includes a circuit breaker and is connected between one of the pair of power terminals and the connection of the first series circuit to a lead. A third series circuit is connected across the pair of leads in a parallel circuit arrangement with the first series circuit and includes a switching circuit so arranged that when the capacitor is charged to a predetermined value, the switching circuit bypasses the resistor. In the event that the capacitor should fail, the switching circuit operates to reconnect the resistor before the circuit breaker operates.

A further feature of the invention includes a thermistor in the third series circuit to increase the operating delay time of the switching circuit and which is bypassed when the switching circuit operates. Preferably the operate time of the switching circuit is in the order of three times that of the time delay constant of the first series circuit. Preferably the switching circuit has a resistance in the order of approximately 10 times the value of the resistance of the resistor and operates when the capacitor is charged in the order of approximately 95 percent of the potential of the power source.

DESCRIPTION OF THE DRAWING

The FIGURE is an electrical schematic of a filter-control circuit made in accordance with the teachings of this invention.

DESCRIPTION OF THE INVENTION

With reference to the drawing, a filter-control circuit 10 has a pair of input terminals 12 and 14 for connection to a low impedance DC power source 16 via a circuit breaker 18 and a pair of output terminals 20 and 22 for connection to telephone switching equipment 24 and the like. The terminals 12 and 20 are interconnected by a filter coil or inductor 26 and a lead 28. A lead 30 interconnects the terminals 14 and 22. The inductor 26 is included in applications requiring the maximum filtering such, for example, as in the transmission battery supply circuit and can be eliminated if less filtering is required. It is conventional in telephone systems to have the inductor 26 connected in series with the negative side of the power source 16 since the positive side of the battery is normally grounded.

A first series circuit including a resistor 32 and a capacitor 34 is connected across the leads 28 and 30. A second series circuit including a switching circuit 36 including a switching device 38 such, for example, as a relay, and a thermistor 40, is connected in parallel across the capacitor 26. Normally open contacts **42*a* and 42*b* of the relay 38 provide a means for shorting or bypassing the resistor 32. Normally open contacts 44 provide a means for shorting the thermistor 40.**

The power source 16, symbolized by a single battery, is actually a plurality of storage cells connected in series. The power source 16 is designed to have a low impedance wherein the resistance is of the order of 0.14 ohms in a range of 10–100 amperehours capacity. The telephone switching equipment 24 and the like require rather large magnitudes of DC current for the operation of the same such as for example, as a range of from 7 to 10 amperes per 100 telephone subscriber lines. In order to minimize variations in voltage applied to the switching equipment all leads including leads 28 and 30 are chosen for their low resistance characteristics to optimize the system operation. The inductor 26 has a low resistance to minimize the voltage drop across the inductor. Typical values are of the order of 0.025 ohms and 400 microhenries. The capacitor 34 has a very high capacitance such, for example, as in the range of the order of 20,000 microfarads to 40,000 microfarads. The high capacitance requirement is necessary because of the low impedance of the power source 16 and the connected load 24 as well as the low resistance of the leads throughout the system. The circuit breaker 18 is a protective device which will trip to open the circuit whenever the current in the circuit exceeds a predetermined overload value. This is to prevent overloads on the power source and cabling in case of fault conditions in the connected load.

The resistor 32 has sufficient resistance and wattage ratings to prevent a large current flow from surging through the circuit breaker 18 thereby "tripping" it when first turning on the power supply and in the event a capacitor failure occurs during normal operation. A value of the resistor 32 is selected wherein the magnitude of the value of the resistor is kept as small as is feasible. For example, for a power source 16 of 48 volts and a current output of 8 amperes and a capacitor 34 having a capacitance of 20,000 microfarads, a typical value of resistor 32 is from 50 to 100 ohms and has 100 to 50 watts power rating.

The relay 38 has a high resistance with respect to the resistance value of the resistor 32. The resistance value of the relay 38 is in the order of approximately 10 times the value of that of the resistor 32 to minimize the power consumption. The operating voltage of the relay 38 is as low as that of the minimum power source 16 voltage to be expected and corrected for circuit design requirement and relay adjustment tolerances. The operate time of the relay is at least three times the time constant of the combination of the resistor 32 and the capacitor 34. The thermistor 40 is included in the switching circuit 36 to provide added time delay, if required; otherwise it may be omitted. As the current flow increases in the circuit more current is passed by the thermistor until such time as the relay 38 picks up and switches the thermistor 40 out of the circuit. The relay 38 is slow to operate by virtue of its designed operating voltage and delay time characteristics of the resistor-capacitor combination. All contacts of the relay 38 have the property of low resistance so as not to degrade the characteristics of the filter.

The relay 38 has a fast release time. Preferably, the release time is less than the operate time of the circuit breaker 18. Therefore, should the capacitor 34 fail, the relay 38 will release, switching the resistor 32 into the circuit to prevent the circuit breaker 18 from operating.

It is to be noted that various switching devices, such, for example, as a solid state switch and other switching circuit arrangements may be employed in lieu of the relay 38 as long as they function in the manner sufficient to accomplish the designed requirements of the filter-control circuit. Such compatible switching devices must be capable of closing a low impedance circuit on a time-delay basis as described.

The filter-control circuit is operated when the circuit breaker 18 is placed in a closed condition. The capacitor 34 begins to charge through the resistor 32. The resistor 32 limits the charging current through the capacitor 34 to a value well within the capacity of the circuit breaker 18. Therefore, the circuit breaker 18 will not prematurely trip and open the circuit. After a sufficient time elapse, of the order of the three times the time constant of the resistor-capacitor combination, the relay 38 operates closing the contacts **42*a* and 42*b* to place the capacitor 34 (and relay 38) directly across the leads 28 and 30. The resistor 26 and the thermistor 40 are bypassed at this time. The capacitor 34 is, at the time the switching circuit 36 operates, charged to a sufficient magnitude of the voltage output of the power source 16 so that when the resistor 32 is shorted, the current surge in the circuit is insufficient to operate or "trip" the circuit breaker 18. A charge value of approximately 95 percent of the voltage output of the power source 16 is preferred. The capacitor 34 continues to charge to 100 percent of the voltage output of the power source 16. The filter-control circuit is now operative to provide the filtering action to minimize any voltage transients in the equipment 24.**

The circuit as illustrated therefore provides a means for automatically charging the filter capacitor. An attendant is no longer required to stand by to do the manual switching from a charging state to a filtering state. This is of importance where an attendant must reactivate several capacitors at once. Instead of waiting for each filter circuit to reach a charged condition individually, the attendant may now, with the circuit of this invention, only reset the circuit breakers and go on about his assigned duties. The filter-control circuit will automatically charge the capacitor and switch to its filtering state.

Should the capacitor 34 fail by shorting through, the circuit of this invention allows the telephone system embodying the filter-control circuit to continue operation. As stated previously, the release time of the relay 38 or switching circuit 36 is less than the operate time of the circuit breaker 18. If the capacitor 32 shorts, the relay is released and contacts **42*a* and 42*b* and 44 are opened to reconnect the thermistor 40 and the resistor 32 into the circuit. The primary function of the resistor 32 at this time is to reduce the current flow through the faulty capacitor to keep the circuit breaker 18 from operating. The telephone switching equipment 24 remains operative but is subject to noise occurrences should voltage transients occur in the circuit from the power source 16.**

It is desirable for personnel in the central office of a telephone system, wherein the filter circuit is suitably employed, to be alerted in case of a malfunction. Therefore, a failure alarm circuit 46 may be connected into the circuit when the relay 38 releases due to a capacitor failure. The contacts of the relay 38, therefore, are double acting contacts connected to the failure-alarm circuit. The failure-alarm circuit may include both visual and audible alarm systems which may be activated by contacts 42*b* and 42*c* when the relay 38 is restored to normal by the failure of the capacitor 34.

I claim:

1. In an electrical power supply system a filter-control circuit for connection to a DC power source having a circuit breaker connected therewith and to a high current load, said filter-control circuit comprising:

a pair of input terminals for connection to the DC power source;

a pair of output terminals for connection to the high current load;

a pair of leads, each of said leads interconnecting separate terminals of each of the pairs of input and output terminals;

a first series circuit including a resistor and a filter capacitor connected across the pair of leads;

switching circuit means connected across said pair of leads and in a parallel circuit arrangement with said first series circuit, the switching circuit means including a relay having a first normally open contact pair connected across said resistor, so that when said circuit breaker is closed and said filter capacitor is charged to a preset voltage level said switching circuit bypasses said resistor and in case of breakdown in said capacitor, said switching circuit operates to remove the bypass around said resistor before the circuit breaker can open, and time delay means connected in series with the coil of said relay, a second normally open contact pair of said relay being connected across said time delay means.

2. A filter-control circuit as set forth in claim 1 wherein:

said switching circuit has a switching time in the order of at least three times the resistance-capacitance time constant of said first series circuit and less than the operate time of the circuit breaker.

3. A filter-control circuit as set forth in claim 1 wherein:

said relay coil has a resistance of in the order of at least ten times the resistance of said resistor.

4. A filter-control circuit as set forth in claim 1 including:

a normally closed relay contact pair connected to one of said leads for applying a signal to an alarm circuit when said relay is deenergized.

5. A filter-control circuit as set forth in claim 4 including:

a third series circuit including an inductor connected in series between a power terminal and a connection of said first series circuit to the lead connected to that power terminal.

6. In an electrical power supply system including a DC power source having a circuit breaker connected in series therewith for driving a high current load, a filter control circuit for interconnecting said power source and said high current load comprising:

a pair of input terminals for connection to the DC power source;

a pair of output terminals for connection to the high current load;

a pair of leads, each of said leads interconnecting separate terminals of each of the pairs of input and output terminals;

a first series circuit including a resistor and a filter capacitor cconnected across the pair of leads;

a parallel circuit arrangement with said first series circuit and including a switching circuit including a relay with a coil having a resistance the magnitude of which is in the order of at least ten times the resistance of said resistor, wherein the operate time of the relay is in the order of at least three times the time constant of said first series circuit, wherein the release time of said relay is faster than the operate time of said circuit breaker, the arrangement being such that when said circuit breaker is closed and said filter capacitor is charged to a preset voltage level said relay is operated to bypass said resistor and in case of breakdown of said capacitor, said relay switches to remove the bypass from the resistor before the circuit can operate;

time delay means connected in series with the coil of said relay, and circuit means for connecting a normally open contact pair of said relay across said time delay means.

7. The electrical power supply system of claim 6 including:

an inductor connected in series with the circuit breaker between the circuit breaker and the connection of the first series circuit to said lead.

8. The electrical power supply system of claim 6 wherein the time delay means comprises a thermistor.

9. The electrical power supply system of claim 1 wherein the time delay means comprises a thermistor.

* * * * *